United States Patent [19]

Parker

[11] 4,242,409
[45] Dec. 30, 1980

[54] PROCESS FOR CRIMPING A NON-WOVEN MAT AND FOAM STRUCTURE PRODUCED THEREWITH

[75] Inventor: Lawrence J. Parker, Converse, Tex.

[73] Assignee: Shelter Insulation, Inc., San Antonio, Tex.

[21] Appl. No.: 965,420

[22] Filed: Dec. 1, 1978

[51] Int. Cl.³ .............................. B29J 1/02; B32B 3/26
[52] U.S. Cl. ...................................... 428/297; 156/79; 264/45.3; 264/46.3; 264/282; 264/286; 425/115; 425/397; 428/317
[58] Field of Search ................. 264/210.7, 210.2, 282, 264/286, 45.3, 46.3; 226/287; 225/167, 288, 286, 97; 425/397, 115; 156/79; 428/297, 317

[56] References Cited

U.S. PATENT DOCUMENTS

| | | | |
|---|---|---|---|
| Re. 29,416 | 9/1977 | Peille | 425/115 |
| 235,698 | 12/1880 | Newton | 264/286 |
| 1,971,667 | 8/1934 | Weeks | 264/286 |
| 2,176,019 | 10/1939 | Cohoe | 264/282 |
| 2,601,200 | 6/1952 | Amos et al. | 264/286 |
| 2,609,320 | 9/1952 | Modigliani | 154/90 |
| 2,728,703 | 12/1955 | Kiernan et al. | 154/130 |
| 2,729,030 | 1/1956 | Slayter | 264/210.2 |
| 2,879,197 | 3/1959 | Muskat et al. | 154/137 |
| 3,050,427 | 8/1962 | Slayter et al. | 156/26 |
| 3,065,500 | 11/1962 | Berner | 425/115 |
| 3,174,887 | 3/1965 | Voelker | 264/46.3 |
| 3,258,812 | 7/1966 | Willy | 425/115 |
| 3,298,884 | 1/1967 | Willy | 156/79 |
| 3,488,929 | 1/1970 | Hale | 56/1 |
| 3,513,645 | 5/1970 | Garrett et al. | 56/1 |
| 3,554,851 | 1/1971 | Modigliani | 428/171 |
| 3,627,603 | 12/1971 | Greig | 156/79 |
| 3,849,526 | 11/1974 | Muller et al. | 264/210.7 |
| 3,860,371 | 1/1975 | Willy | 264/45.3 |
| 3,865,661 | 2/1975 | Hata et al. | 156/79 |
| 3,867,494 | 2/1975 | Rood et al. | 264/45.3 |
| 3,870,588 | 3/1975 | Yamamoto | 264/45.3 |
| 3,980,511 | 9/1976 | Proucelle | 156/62.4 |
| 4,028,158 | 1/1976 | Hipchen et al. | 156/79 |
| 4,087,226 | 5/1978 | Mercer | 425/397 |
| 4,118,533 | 10/1978 | Hipchen et al. | 428/297 |
| 4,153,664 | 5/1979 | Sabee | 264/282 |

FOREIGN PATENT DOCUMENTS

| | | |
|---|---|---|
| 850495 | 5/1977 | Belgium . |
| 2700907 | 7/1977 | Fed. Rep. of Germany . |
| 1426604 | 12/1966 | France . |
| 37-4627 | 6/1962 | Japan .................................. 264/286 |

*Primary Examiner*—Jay H. Woo
*Attorney, Agent, or Firm*—Weiser, Stapler & Spivak

[57] ABSTRACT

The fibrous structure of a non-woven mat is disrupted by an apparatus comprising at least one roll which has one or more upraised ribs in a chevron pattern extending helically around the roll. In processing, the mat passes under tension over at least a portion of at least one chevron roll and preferably over two chevron rolls which may or may not be intermeshing. Thereafter, the mat may be crushed or crimped by being fed through to intermeshing third and fourth chevron rolls. Additional rolls may be supplied to exert tension. The mat which exits from the apparatus has a disrupted fibrous structure and is a superior skeleton within a structure such as a polymeric foam board.

20 Claims, 6 Drawing Figures

U.S. Patent Dec. 30, 1980 4,242,409

PROCESS FOR CRIMPING A NON-WOVEN MAT AND FOAM STRUCTURE PRODUCED THEREWITH

BACKGROUND OF THE INVENTION

Non-woven mats have been used in the production of rigid polymeric foam boards for the construction of walls, ceilings or insulation panels on the inside or outside of such structures. The mat may be laid down with the reactants necessary for a polymeric foam between two sheet substrates. While the reactant mixture rises, it penetrates the mat and the board produced gains structural integrity as well as other characteristics from the presence of the mat in its interior.

Foam structures utilizing fibrous mats for reinforcement are described in U.S. Pat. Nos. 3,554,851, 3,860,371, 3,865,661 and 3,867,494. However, upon the application of delamination forces such as heat, humidity or simply physical stress, a foam board with a fibrous mat in its interior may delaminate along the plane of the mat itself, thus defeating the reinforcement benefit of the mat.

SUMMARY OF THE INVENTION

It has been found that by passing a non-woven fibrous mat under tension through a roll assembly having at least one roll with a "chevron" or "herringbone" rib pattern, the fiber structure of the mat will be disrupted. Preferably, first and second chevron rolls will be provided having opposite chevron designs, rotating in opposite directions and preferably not intermeshing. Third and fourth rolls may also be used having opposite chevron designs and rotational directions but these preferably do intermesh and the mat is crushed or crimped between this pair of rolls. Preferably, chevron designs are fixed such that the "arrow" formed by the chevron points toward the mat which has just passed over that roll when the "arrow" contacts the mat. By this method and with the apparatus, a mat is produced which will provide superior reinforcing and flame spread preventing properties for a foam structure when the foam is distributed throughout the mat.

DETAILED DESCRIPTION OF THE INVENTION

Figure 1:
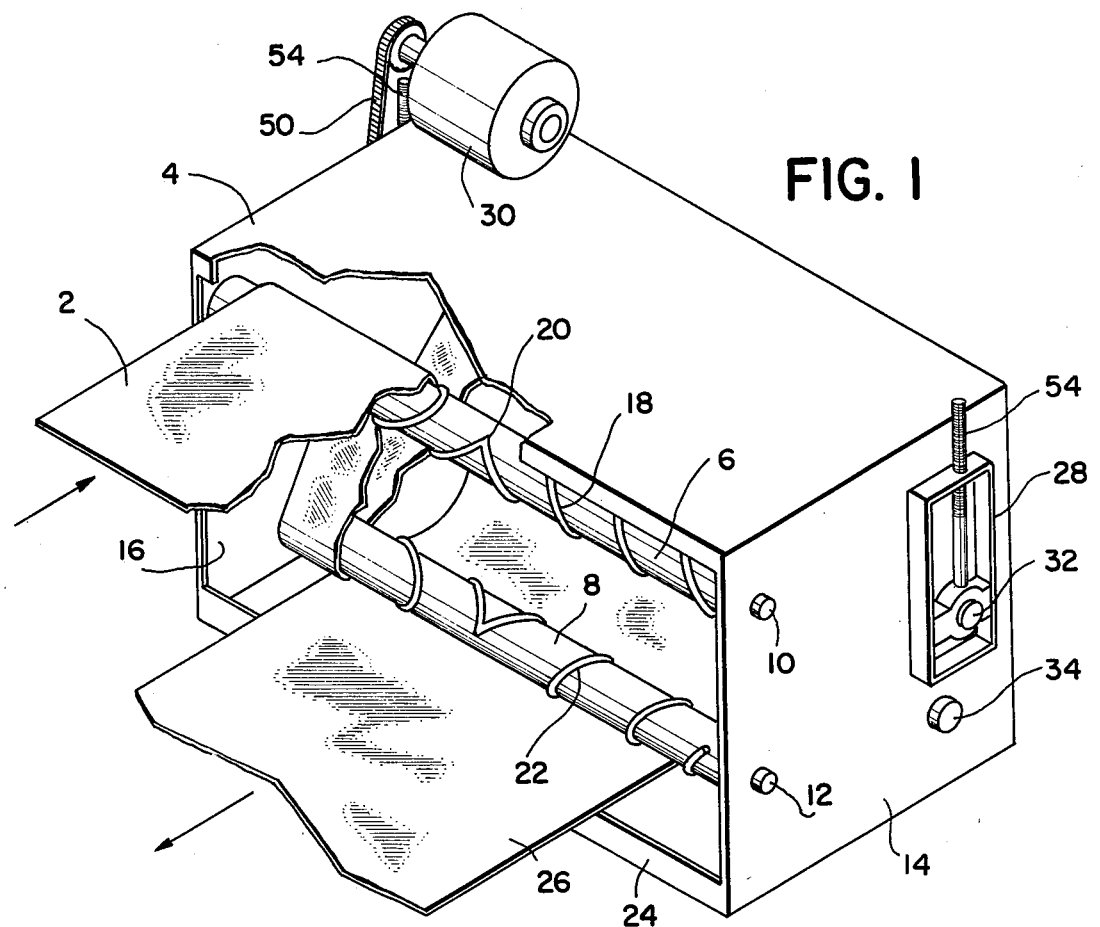
FIG. 1 depicts a front view of an apparatus according to the invention with a mat passing over the first two chevron rolls and the processed mat exiting from the apparatus.

The non-woven fibrous mats which may be processed according to the present invention may be composed of one or more distinct layers of organic or inorganic fibers or mixtures thereof. The mat can be exclusively of the fibers or may have a binder deposited thereon to maintain the integrity of the structure. Further modifications of this basic design include dispersed filler and coloring agents. Specific examples which may be used include fabric mats of fiber glass, cellulose or an organic polymer, e.g. polyesters including a dimethyl terephthalate and ethylene glycol polyester such as Dacron and polyamides such as the Nylon materials.

A preferred non-woven mat is one of fiber glass such as the "Schüller" mats which may be obtained from sources such as JohnsManville Corp. of Waterville, Ohio and Denver, Colo., Nicofibers, Inc. of Shawnee, Ohio and other suppliers. Such mats may have varying amounts of binder which is deposited on and within the mat to maintain its shape and dimensions, examples being melamine, phenolic, urea-formaldehyde, epoxy and polyester type compositions.

Fiber glass or other fiber mats for use in the invention are advantageously about 8 to 70 mils in thickness and have weights varying from about 0.8 to 4 pounds per 100 square feet. The invention process will not only disrupt the fiber structure but will also increase the mat thickness, e.g. to about 2 to 60 times the initial thickness. Thus, with the Surmat 200 fiber glass mat from Nicofibers, Inc., the mat width can increase from an initial 48 inches to 52 inches and the thickness can expand from an initial 10 mils to a post-processing 30 to 600 mils with the process of the invention.

According to the invention, the fiber mat is passed under tension over at least one rotating chevron roll. The upraised chevron pattern should preferably extend helically from one end of the roll to the other and be placed with the point midway between the ends of the roll and the ribs extending at about equal angles therefrom around the roll and to the ends. The roll may be freely rotating, freely rotating but with a partial brake to increase the force necessary for rotation or may be driven.

It has been found that as the height:width ratio of the ribs of the chevron rolls increases up to about 1:1, excellent and controlled disruption of the fibrous structure of the mat will be obtained.

The tension applied to the fiber mat is in the lengthwise direction, i.e. the direction of movement or progression of the mat which is perpendicular to the roll. However, as opposed to other processes such as that described in U.S. Pat. No. 4,028,158 where mat stretching is achieved only in the direction of tensioning which is also the direction of movement within the apparatus, mat stretching in the invention is achieved in the axial direction of the roll which is perpendicular to the direction of movement. This is accomplished without the use of clamps or other devices, such as where the mat is successively passed through two sets of rolls, the second of which rotates faster than the first set which thereby causes a tensioning. With the process of the invention, the tension should be such as to force the mat into the grooves formed between the ribs of the chevron pattern but insufficient to tear the mat completely. Preferably, the surface velocity of the surface of the roll or rolls should be about equal to that of the mat.

It has surprisingly been found that continuous widthwise stretching and uniform thickening of an essentially endless nonwoven mat may be accomplished with the chevron roll of the invention which crimps and crushes the mat as well as stretches it in essentially a diagonal direction, i.e. in a direction having both widthwise and lengthwise components relative to the mat. With the diagonal stretching of the invention, the resultant distortion of the mat is divided between lengthwise and widthwise components whereby the width is not necessarily increased so radically such that there is required a modification of the apparatus to take into account such a change in width.

Preferably, with the process of the invention, a nonwoven fibrous mat is drawn over at least about ½ of the area of a rotating roll having an upraised chevron design preferably with the point of the chevron pointing toward the outgoing mat as it touches the mat. The area of the roll contacting the mat may simply be determined by viewing the mat and roll from the side, noting the two points of separation of one from the other and calculating the percentage of the circumference defined thereby.

Preferably, the fibrous mat will be drawn over at least 2 rotating chevron rolls, contacting at least one over at least about ½ of its surface area.

The effect achieved by passage of the non-woven fibrous mat over the one or more chevron rolls is to disrupt the fibrous structure, more specifically to crimp and bend the glass fibers whereby fiber layer boundaries which may have been distinguishable prior to processing will be eliminated. The process will substantially increase the amount of fibers projecting out of the plane of the original mat and increase the mat thickness at least 2 times. When used in a foam laminate board, the processed mat does not rely entirely on the expanding foam for its distribution within the board. Further, since the fibers will extend in all directions, there will be a reduced occurrence of discernible layers in the foam laminate board which may be a pathway for delamination. As opposed to the glass mats in U.S. Pat. Nos. 4,028,158 and 4,118,533, the fibers of the fibrous mats produced according to the invention are not arranged in layers and will be basically or substantially irregular in orientation with numerous crimps and bends. After processing according to the invention, a single fiber, e.g. a glass fiber, several feet long will be seen to follow a twisted path through the mat, bending in and out of a given plane.

After processing according to the invention, the mat will not only have a very wavy fibrous structure and be at least doubled in thickness but will also exhibit a widthwise or transverse stretching up to about 10 or 20%, i.e. stretching in the direction parallel to that of the roll over which the mat had just passed. The transverse stretching produced with the invention is achieved without any clamping or securing of the edges as is required in other methods, e.g. as utilized in U.S. Pat. Nos. 3,554,851 and 4,087,226. This aspect of the invention also facilitates a continuous process without the need for constant clamping and releasing of the mat edges. Although continuous lengthwise stretching, i.e. stretching in the direction of processing, is mentioned in U.S. Pat. No. 4,028,158, it was an unexpected aspect of the present invention that a continuous process could be run with continuous widthwise or transverse stretching. That is, it is not required in the present invention to individually cut off or even make attachment to individual sections of mat to achieve widthwise expansion.

After exiting from the apparatus of the invention having at least one chevron roll in the orientation described above, the processed mat together with foam-forming reactants may be inserted in a continuous manner directly between the two board facings to produce the foam board. The mat is thus laid down continuously within the laminate, progressing in the same direction as it exits from the apparatus. Cutting of the processed mat transversely as it exits the final chevron roll is not required although it may be desired to trim off the edges, i.e. in a plane perpendicular to that of the mat and a direction parallel to the edge. As the processed mat leaves the apparatus, its fibrous structure will have been weakened and crimps and other irregularities will have been added so that the mere movement of the mat thereafter will itself cause a further increase in thickness and expansion of the mat. In fact, the crushing and deforming of the individual fibers during processing will store forces in the mat which, upon merely standing, will cause a further increase in thickness and expansion. It is thus preferred in the invention process to allow the processed mat to be in a non-tensioned or relaxed state before being used in the foam board. This may be accomplished by simply insuring that the mat is loose between the last chevron roll and the point at which it comes into contact with the foam reaction mixture and the two facing sheets for the foam board. This aspect of the invention allows a great degree of freedom in processing since the coordination of speeds of the mat preparation apparatus and the board fabrication machinery will not be critical. As opposed to processes which require the mat to be under tension as it is introduced into the board-forming machinery, precise adjustment and maintenance of the processing speeds of the two machines is not essential.

Before being inserted between the two board facings, the processed mat will be seen to be thicker, slightly wider and with a more disrupted fiber structure than the unprocessed mat. The fibers will extend through three dimensions in the structure and will be intermeshed therein.

In the foam board fabrication, two board facings, e.g. of asphalt saturated or impregnated felt, are fed with the processed mat and the polymeric foam reactants into the board fabrication machinery. Thus, the bottom facing may be fed horizontally with the mat thereon and the foam reactants will be laid down on the mat just before the top facing comes into contact with the mat, such as being fed from a roll mounted above the apparatus. Preferably, the top facing will be fed downward and around a doctor or metering roll which is set to provide a spacing between the top and bottom facings whereby only a metered and proper amount of foam reactant mixture for the particular board thickness desired will pass between the facings. In general, the bottom facing proceeds over a plate and the top facing is fed around a single metering roll. The nip or distance between the metering roll and the plate is calculated by considering the thickness of the facings and the desired thickness of the foam within the finished board. Thus, about 2 to 4% of the thickness of the foam within the board is the spacing to be altered for the reaction mixture between the metering roll and the plate. For example, if the foam laminate board, considered in its cross-sections, comprises 2.8 inches of foam and two 33 mil facing sheets, the doctor or metering roll should allow the passage of about 56 to 112 mils of foam reaction mixture which results in the provision of a nip between the metering roll and the bottom plate of about 122 to 178 mils.

Preferably, the cross-sectional dimension, or thickness, of the non-woven mat processed according to the present invention will be greater than the opening provided between the two facing sheets at the location of the metering or doctor roll. That is, the nip distance between the doctor or metering roll and the plate on which the bottom facing is carried minus the thicknesses of the two facing sheets will be less than the thickness of the mat fed into the nip. This results in a compression of the mat as it passes through the nip and before its incorporation with the board structure.

In one embodiment of the invention, the unprocessed mat will be unwound from a horizontally fixed roll of matting and horizontally fed from the top into a roll assembly comprising four chevron rolls or rollers as shown in FIG. 1. The unprocessed mat 2 proceeds from its storage roll (not shown) into the assembly 4 and over the first chevron roll 6. The mat is pulled, as explained below, in view of its being held and crimped between the intermeshing and rotating third and fourth chevron rolls described hereinafter. After proceeding around the first chevron roll 6, the mat is directed downward and around the second chevron roll 8.

The first and second chevron rolls 6 and 8 are preferably placed so that they do not intermesh. Each is parallel and mounted to allow rotational movement in the same or in opposite directions. In order to force as much of the mat surface against rolls 6 and 8 at a given instant and to accomplish the processing in as little space as possible, rolls 6 and 8 do not intermesh and rotate in opposite directions as shown in FIG. 1, e.g. by rotating about shafts 10 and 12 which are inserted into apertures in the sidewalls 14 and 16 of assembly 4. Rolls 6 and 8 are of elongated cylindrical shapes and disposed transversely to the mat which should preferably cover at least one half of either roll 6 or 8. They may be constructed of any rigid material such as wood, metal or polymer. Each has extending radially outwardly therefrom at least one rib formed in a chevron or herringbone pattern.

The chevron rib 18 of roll 6 is positioned such that its "point" 20 is located at approximately the center of the roll. From the point 20 of the pattern, the chevron rib 18 extends over the outer surface of the roll 6 to both ends thereof at preferably an approximately identical angle, resulting in the number of turns of the rib being the same as between the two portions of the roll 6 distinguished by point 20. Also in this embodiment, the turns of chevron rib 18 will be equally spaced. Although FIG. 1 depicts a single chevron rib on each of rolls 6 and 8, two or more chevron ribs may be used and these may or may not be equally spaced. For example, a second chevron may be placed parallel to the first and with its point at a position about one-third of the circumference removed from the point 20.

It has surprisingly been found that an excellent disrupting and thickening action will take place if each chevron roll is disposed such that the portion of the chevron pattern defining an angle less than 180° is toward the mat portion about to pass thereover. This may be shown by considering the portions of chevron rib 18 in FIG. 1 near the point 20. These portions define an angle greater than 180° and one less than 180°, totalling 360°. Preferably, the portion less than 180° faces and extends outwardly toward the incoming mat 2, i.e. the point 20 points toward the portion of the mat exiting over the roll 6.

Chevron ribs 18 and 22 of rolls 6 and 8, respectively, may be integral with the roll or may be removably attached thereto. Preferably, the rib comprises two sections, each starting at the center, represented by point 20 of roll 6, and extending to the end of the roll after having been helically wrapped about the roll. For example, the rib may be formed of two identical lengths of plastic laboratory tubing, such as Tygon tubing, and may be attached by driving screws through the tubing at both ends and into the roll. In this embodiment, four screws would be used to affix chevron rib 18 to roll 6. This arrangement allows easy modification of the helical angle of the chevron rib 18 attached to the roll 6. In general, the lower the value of the angle less than 180° defined at point 20 of chevron rib 18, the greater will be the number of turns of the rib 18 about roll 6 and this will result in more control over the movement of mat 2 as it passes over roll 6 but less modification and disruption of its structure. Thus, by having a removable chevron rib, the operator will be able to easily adjust the control and disruptive effects of rolls 6 and 8. In general, chevron ribs 18 and 22 may be a hollow material such as plastic or metal tubing or a solid material such as rubber stripping with a rectangular or triangular cross-section and may be integral with, or permanently or removably attached to the rolls 6 and 8. It has been found that Hycar, Neoprene or other rubber or pliable materials with a rectangular cross-section, e.g. ¼ inch or ½ inch square rubber strips, provide excellent control and tensioning of the mat. These strips can be adhesively bonded over its length to roll 6 and may be preferable to the attachment at only 3 or 4 places since such partial attachment may cause excessive movement of the strips on the roll.

The rotational movement of rolls 6 and 8 may optionally be impeded by utilizing a brake or other friction-generating device. Adjustment of such a brake against the movement, e.g. against shafts 10 and 12, permits modification of the tensions within the mat 2 as it passes through the assembly 4. Thus, tensions within the mat will not cause tearing while at the same time insuring desired disruption of the fibrous structure.

After the unprocessed mat 2 in FIG. 1 passes in one direction over roll 6 and then in the opposite rotational direction over roll 8, it passes in between two crushing rolls, not shown in FIG. 1 but described below by reference to FIG. 2, after which it exits assembly 4 over optional guide bar 24 as processed mat 26. Also shown in FIG. 1 and described below with reference to FIG. 2 are a roll pressure adjusting device 28, a motor 30 for driving one or both of the crushing rolls and shafts 32 and 34 of the crushing rolls, adjusting screws 54 and chain 50.

Figure 2:
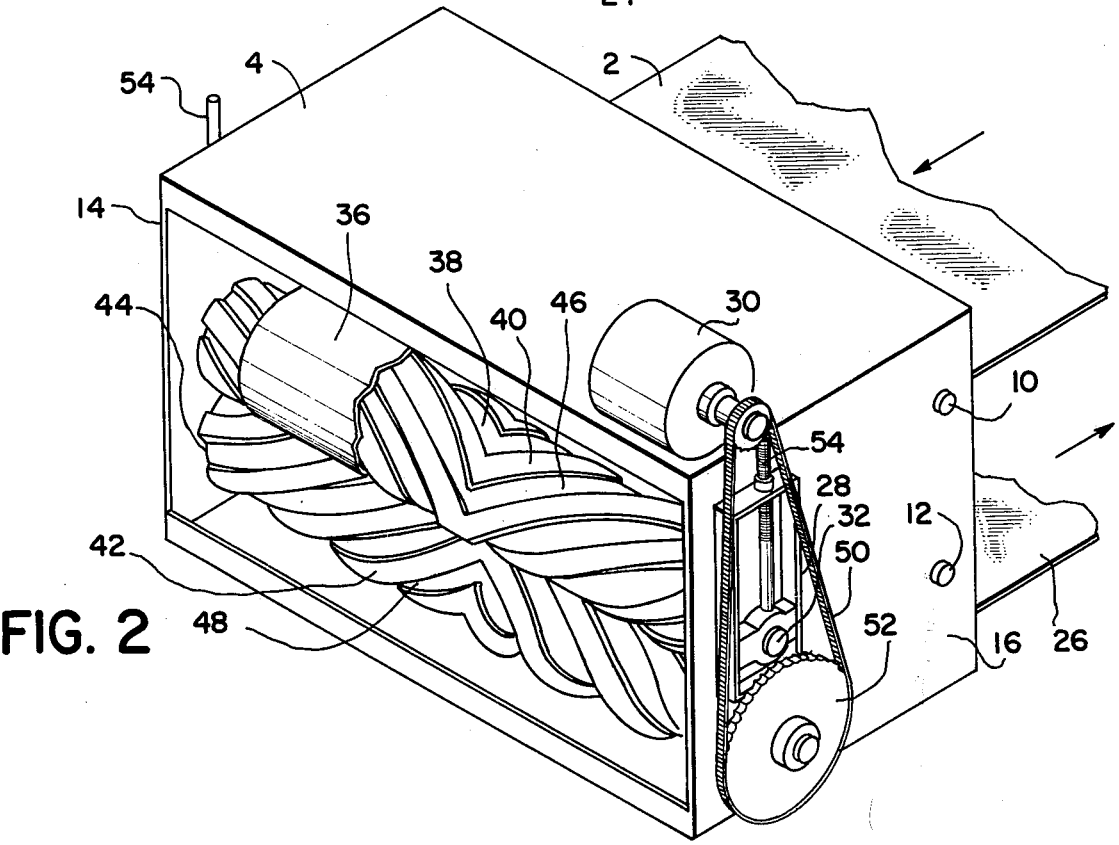
FIG. 2 shows the rear of the apparatus of FIG. 1 with the exposed third and fourth chevron rolls which intermesh.

FIG. 2 depicts a rear view of roll assembly 4 with the unprocessed mat 2 coming in and the processed mat 26 exiting. After passing around chevron roll 8 in FIG. 1, the tensioned mat 36 passes up and over crushing roll 38 and then into the intermeshing ribs 40 and 42 of crushing rolls 38 and 44, respectively.

The crushing rolls 38 and 44 preferably have ribs with chevron designs or patterns and since they intermesh, the chevron pattern of ribs 40 and 42 and grooves 46 and 48 of one roll is of the opposite contour to those of the other roll of the pair to permit continous intermeshing of the ribs and grooves of each other during rotation. Preferably, rolls 38 and 44 comprise a plurality of substantially identical integral ribs equally spaced and extending around the periphery of the body portion of the roll, the ribs forming a plurality of grooves of similar contour between each adjacent pair of ribs with the opposite sides of each rib being substantially parallel but inclined at a radially outwardly diverging angle with respect to the nearest side of the adjacent rib.

Examples of chevron crushing rolls 38 and 44 for use in disrupting the fiber structure of a non-woven mat include the hay conditioning rolls described in U.S. Pat. Nos. 3,488,929 and 3,513,645 with a chevron pattern, these patents being hereby incorporated by reference. Such hay conditioning rolls are available from Sperry-New Holland of New Holland, Pa. in diameters of 7¾" and 10⅜" in widths of about 53¾".

Although the chevron design of a rib on rolls 38 or 44 may have more than one point, i.e. as one follows a single rib around a roll, the number of times the helical direction reverses itself is the number of points in the chevron design, the rolls will preferably be a single point chevron design with the point in the center of the roll.

Crushing chevron rolls 38 and 44 may be constructed as those in U.S. Pat. No. 3,513,645, e.g. of rubber or other suitable elastomeric material. However, while hay processing rolls are believed to be operated with the angle of the chevron less than 180° disposed toward the outgoing material, as explained above, preferably those of the invention are rotated with this angle toward the incoming mat. It was thus surprising and unexpected that excellent disruption of the mat structure, e.g. by breakage of the binder bonds, could be achieved by rotating the rolls in the direction opposite to that for which they were intended. It was surprisingly found that the degree of disruption of a mat was far greater with the rolls in the preferred orientation of the invention as opposed to that used in hay processing.

The rolls described in U.S. Pat. No. 3,513,645 may be modified for the purpose of this invention by raising the ribs' height, e.g. by adhesively applying strips of rubber to the outer surface of the ribs. For example, the Sperry-New Holland rolls described above having 2 inches wide and ¾ inches high were modified by vulcanizing thereon two 0.5 inch Hycar rubber strips to give a rib about 1¾ inches high. It was found that as the height:-width ratio of the ribs and grooves was increased to about 1:1, the mats became more uniformly puffy and expanded from their original flat condition. For example, a 20 mil fiber glass mat, when processed in the apparatus of FIGS. 1 and 2 with chevron rolls 38 and 44 having 2" wide by 1¾" high was expanded to a thickness of about 1500 mils. Additionally, the 2 inch wide ribs may be replaced by 1 inch wide ribs having a height of 2 inches.

The movement of the incoming unprocessed mat 2 is generated by having a motor 30 or other rotational movement generating means attached to one or both of crushing chevron rolls 38 and 44, e.g. by chain 50 and sprocket 52. FIG. 2 depicts motor 30 as driving lower chevron roll 44 by a chain 50 and sprocket 52 but this arrangement may be replaced by a corresponding belt and pulley, toothed belt and cog or even by direct gear drive between the motor 30 and shaft 34 of roll 44.

The speed of chevron roll 44 may be adjusted by utilizing a variable speed motor as motor 30, e.g. a Dayton adjustable speed gear motor #6K-119 with a capability of 18 to 108 RPM. Alternatively, the variable speeds may be achieved by the use of a motor pulley with a variable circumference, e.g. those obtained from Maurey Manufacturing Corp. of Chicago, Ill.

Preferably, the linear speed of the mat and the rate of movement of the surfaces of the chevron rolls 6 and 8 and the crushing chevron rolls 38 and 44 will all be substantially the same, e.g. about 10 to 120 feet per minute, preferably about 25 to 50 feet per minute.

The pressure exerted between crushing chevron rolls 38 and 44 may be adjusted by pressure adjusting devices 28 which may comprise screws 54 which press down upon the shaft 32 of crushing chevron roll 38. Since the crushing chevron rolls 38 and 44 are preferably made of a rubbery but firm material, there need be no or little clearance between the opposing ribs and grooves to allow passage of the mat.

Figure 3:
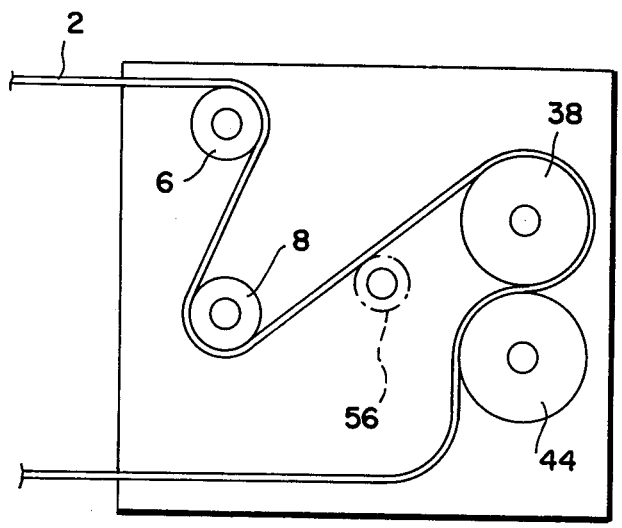
FIG. 3 is a cutaway sideview schematic of the apparatus depicted in FIGS. 1 and 2.

FIG. 3 is a side-view schematic of the embodiment of the invention shown in FIGS. 1 and 2. The unprocessed nonwoven mat proceeds horizontally over chevron roll 6 which rotates clock-wise with the movement of the mat which then is directed around chevron roll 8. Optionally, a tension roll 56, with or without a surface modification such as one or more chevron ribs, which is adjustable in any direction is provided between the second chevron roll 8 and the first crushing chevron roll 38. The tension roll 56 may be on either side of the mat. Thereafter, the mat proceeds over crushing chevron roll 38 and through the intermeshing ribs and grooves of crushing chevron rolls 38 and 44 and horizontally out of the assembly as a processed mat which has been thickened and has a disrupted fiber structure.

Figure 4:
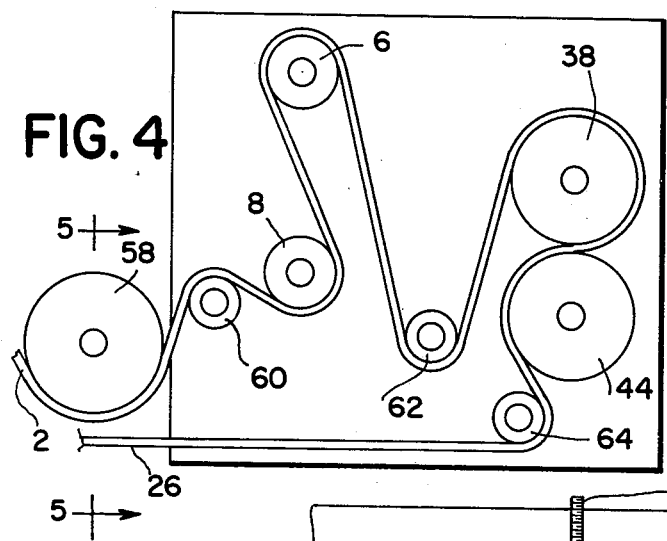
FIG. 4 is a cutaway sideview schematic of an additional embodiment of the invention where tension rolls and a roll having mounted wheels is further provided.

FIG. 4 is a side-view schematic of a second embodiment of the invention. Unprocessed mat 2 proceeds diagonally downward and under plated roll 58 which is described more fully below with reference to FIG. 5. Thereafter, the mat 2 is directed upward over tension roll 60, similar to tension roll 56, and under and around chevron roll 8. Thereafter, the mat proceeds over chevron roll 6, downward around a tension roll 62, similar to tension rolls 56 and 60, and around crushing chevron roll 38. After being crushed between intermeshing crushing chevron rolls 38 and 44, the mat is made to lay close to roll 44 by tension roll 64, similar to tension rolls 56, 60 and 62. The function of the tension rolls 56, 60, 62 and 64 is to adjust the tension within the mat so that desired disruption takes place with minimal actual tearing and also to hold the mat against as much of the exposed chevron rolls 6 and 8 and crushing chevron rolls 38 and 44 as possible.

In the second embodiment of the invention as depicted in the side-view schematic FIG. 4, all of the characteristics, preferred aspects and optional additions with respect to the first embodiment shown in and described with reference to FIGS. 1, 2 and 3 will apply.

Figure 5:
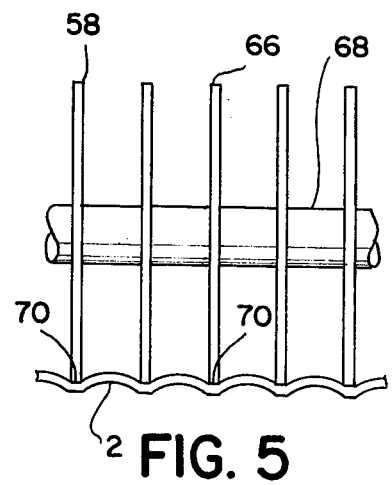
FIG. 5 is a front view of the roll having mounted wheels utilized in the apparatus depicted in FIG. 4.

FIG. 5 depicts a front view of plated roll 58 as shown briefly in FIG. 4. Plated roll 58 comprises a shaft 68 and circular plates 66 which may be integral with or attached to the shaft 68. The plated roll 58 may be constructed by stacking one or more wire spools on a shaft and simply allowing them to rotate as the mat 2 passes thereover. Alternatively, the plates 66 may be integral with or permanently attached to the shaft 68 in which case the shaft is preferably permitted to rotate as the mat passes thereover. As with chevron rolls 6 and 8, a brake or other device may be added to provide friction so that the outer surface 70 of the plate does not move at the same speed as the mat passing thereover or alternatively, the brake may be adjusted so that the speed is the same as the mat but a tension is conveyed thereto.

Additional examples of rolls for use as the plated roll 58 in FIGS. 4 and 5 are those described in U.S. Pat. No. 4,087,226. Although the longitudinal sides of the mat may be secured as the mat passes through the roll assembly of the invention or even just over one roll such as plated roll 58, this is not necessary in the present invention. An example of such holding means for both sides of a web is described in U.S. Pat. No. 4,087,226. Further, two overlapping plated rolls may be used, one on either side of the mat, as in U.S. Pat. No. 4,087,226.

Figure 6:
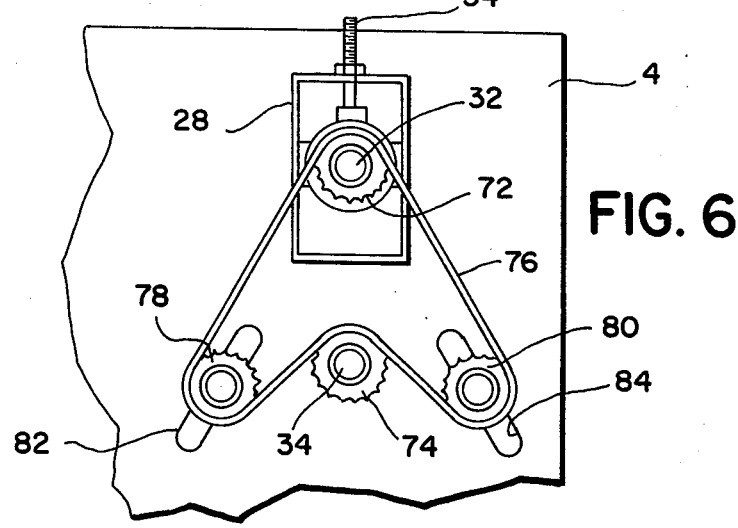
FIG. 6 is a side view of a portion of the apparatus depicted in FIG. 1 with a modification to drive the top roll.

FIG. 6 indicates an adaption of assembly 4 depicted in FIG. 1 whereby the driving force for the rotational movement of upper crushing roll 38 is supplemented by a drive means between shafts 32 and 34. For example, the drive means provided in FIG. 6 to connect shafts 32 and 34 comprises sprockets 72 and 74, respectively, and chain 76 with adjustment being supplied by movable sprockets 78 and 80. Sprockets 78 and 80 freely rotate and the tension they provide against sprockets 72 and 78 by chain 76 may be changed by their movement within slots 82 and 84, respectively. The adjustment obtained with slots 82 and 84 may also be provided by a series of apertures into which sprockets 78 and 80 may be inserted or even by changing the diameter of sprockets 78 and 80.

The sprockets 72, 74, 78 and 80 of FIG. 6 may be substituted by pulleys with a corresponding substitution of the chain 76 by a belt. Alternatively, the sprockets 72, 74, 78 and 80 can be replaced by cogs with the use of a toothed belt in place of chain 76 or the sprocket and chain drive may be totally substituted by providing direct gear drive between shafts 32 and 34.

The utilization of the drive arrangement of FIG. 6 allows adjustment of the manner in which crushing rolls 38 and 44 intermesh with each other and ultimately adjustment of the disruption and crimping of the processed mat. Without a drive arrangement, the roll not motor driven, e.g. roll 38 in FIG. 2, is simply pulled along in its rotation by intermeshing with the motor driven roll. Thus, one wall of a given rib will press against the groove wall in which it meshes more forcefully than the opposite wall of that rib. The uneven forces and wear may shorten the useful life of the roll and may cause unevenness in the crushing and crimping of the mat and thus the thickness of the final product or may even cause cutting of the mat. This may cause uneven wear of the rib and groove wall since the two rolls may not center on each other during operation. The use of a drive means between the two crushing chevron rolls allows the centering of each rib in the corresponding groove of the other chevron roll and permits avoidance of the problems indicated above.

The non-woven fiber mats processed according to the present invention by having been passed over a chevron roll under tension as described above may be used in the production of structural foam members, e.g. foam boards. Such structures are produced by feeding a polymeric foam reaction mixture together with the non-woven mat between two enclosing layers which are preferably flexible sheetings. The board-foaming process is suited to be continuous from an economic standpoint and the method of the invention is uniquely adaptable to facilitate such a continuous operation.

The mat produced according to the present invention may be utilized in virtually any rigid or flexible polymeric foam such as those of urethane, phenolics, blown glass, vinyls, epoxies and urea-formaldehydes. Foams which have attracted interest in view of their low flame spread and excellent structural characteristics are the polyisocyanurate foams. Boards using such polymers are described in U.S. Pat. Nos. 3,940,517, 3,954,684, 4,024,310, 4,025,687, 4,028,158 and 4,118,533 as well as my co-pending U.S. application Ser. No. 941,057, filed Sept. 11, 1978, all of which are hereby incorporated by reference. The polyisocyanurate foams are generally produced by admixing a polyisocyanate, a polyol, a blowing agent and a catalyst to yield a foam reaction mixture which is then deposited together with the processed non-woven fibrous mat between two rigid or flexible facings. As the reaction mixture foams, it fills the spaces within the mat and between the mat and facings which may be held in place by platens or other solid sheets.

Foam boards produced according to the present invention have been found to have excellent splitting resistance, flame spread characteristics and are of surprisingly consistent quality from batch to batch and even over the length, width and thickness of an individual board. The rejection rate of the boards decreased significantly with respect to boards produced with unprocessed mats, particularly fiber glass mats. This may be attributed to the increased mobility of the foam mixture within the mat during fabrication caused by the disrupted structure of the mat. With the unprocessed mat, the foam mixture will often lie on the mat surface and may not be uniformly distributed in the final board product. Thus, with the process of the invention, the processed mat structure will extend in the foam in all directions and will permeate the foam interior without significant bunching or gathering at a given plane or in a particular direction. Prior boards which used mats which had been puffed or expanded by the application of clamps or other securing devices at opposing ends followed by stretching suffered from disadvantages in that the mat fiber density was not consistent since the material under the clamps would not be affected and mat material located further from the clamps would be stretched more than that close to the clamps. In such a situation either the edge portions of the mat would be discarded or an unacceptably large percentage of the foam boards would not pass building specifications.

REFERENCE EXAMPLE

A length of 48" will Surmat 200 fiber glass mat from Nicofibers, Inc. of Shawnee, Ohio was passed through intermeshing chevron rolls from Sperry-New Holland of New Holland, Pa. The chevron rolls were $10\frac{3}{8}$" in diameter, $53\frac{3}{4}$" wide, weighed 868 pounds for the pair and were identical to those from a Model 1112 Speedrower brand self-propelled Windrower from Sperry-New Holland. Additionally, the ribs of the chevron patterns were about 2 inches wide and each roll had 5 ribs. The rolls were rotated by an electric motor with the portion of the chevron angle less than 180° being toward the incoming mat. The mat was not under tension and did not come into contact with any significant area of the rolls other than those areas of the rolls actually intermeshing. The fiber structure of the mat which exited from the rollers was disrupted to only a minor extent and the mat itself was basically only wrinkled by the treatment.

EXAMPLE 1

The arrangement of the Reference Example was modified by having the unprocessed mat pass over two chevron rolls rotating in opposite directions and as depicted schematically in FIG. 3. The two chevron rolls were 4" diameter 54" long metal tubes fitted with bearings and shafts at both ends. Midway between the ends of the tubes on the outside surface, two $\frac{1}{2}$" diameter $\frac{1}{8}$" wall Tygon tubing lengths were affixed by screws. The tubings, two on each metal tube, were helically wrapped about the metal tube in opposite directions to the ends to result in loops on either side and the ends fastened, again with screws. Six loops were formed on each side of each added roll.

The fiber glass mat exiting from this arrangement was uniformly puffy and at least twice as thick as the unprocessed mat. Further, the width increased to about 50" and visual inspection showed that many intersecting fiber strands which had been affixed to each other with binder had been broken apart by the process. This mat was used in the interior of a polyisocyanurate foam board to provide structural integrity and the board exhibited a lowered tendency to split under stress as compared with a similar board having the unprocessed fiber glass mat in its interior. That is, it has been found that foam boards produced with the mat processed according to the invention exhibit less of a tendency to split in a plane parallel to the facing plane than boards produced with unprocessed mats which have discernible layers while at the same time exhibiting excellent flame spread characteristics.

The Example arrangement was modified by using chevron rolls 6 and 8 with 9 and 11 loops on both sides. However, as the number of loops increased, the stretching and disrupting of the fiber structure decreased.

EXAMPLE 2

The arrangement of Example 1 was used to process a 20 mil thick fiber glass mat. However, each of the 2 inch wide and ¾ inch high ribs of the intermeshing crushing chevron rolls was modified by vulcanizing thereto two ½ inch thick rubber strips 2 inches in width. The distance between the crushing chevron rolls was adjusted accordingly to take into account the ribs now being 1¾ inches in height.

After processing, the fiber glass mat was found to be about 1500 mils in thickness and this dimension was consistent over the length and width of the mat processed.

While in the foregoing specification, embodiments of the invention have been described in detail, it will be appreciated that numerous changes may be made in those details by those skilled in the art without departing from the spirit and principles of the invention.

What is claimed is:

1. A method of disrupting the fiber structure and at least doubling the thickness of a non-woven fibrous mat comprising
passing said non-woven fibrous mat under tension over a first rotating roll having extending radially outwardly therefrom and helically therearound at least one rib formed in a chevron pattern, wherein the portions of the rib extending away from the point of the chevron are curved continuously over substantially the entire width of the mat, and
passing said mat over a second rotating roll having extending radially outward therefrom and helically therearound at least one rib formed in a chevron pattern disposed on said second roll, wherein the portions of the rib extending away from the point of the chevron are curved continuously over substantially the entire width of the mat, and
wherein both of said first and second rolls are disposed with the portion of the chevron pattern defining an angle less than 180° toward the mat portion coming into contact with said first or second roll.

2. The method of claim 1, wherein said mat comes into contact with at least about one half of the surface area of said roll and said mat is under tension.

3. The method of claim 2, wherein said chevron pattern is disposed on said roll with the point at which the rib changes direction being located about midway between the roll ends and wherein the portions of the rib extending from said point extend at approximately equal angles.

4. The method of claim 3, wherein said mat is a fiber glass mat.

5. The method of claim 4, wherein said roll and said second roll rotate at approximately the same speed and the surface velocity of said rolls is approximately equal to the linear velocity of said mat over the rolls.

6. The method of claim 4, wherein said first roll and said second roll are approximately parallel to each other and rotate in opposite directions.

7. A method of disrupting the fiber structure and at least doubling the thickness of a non-woven fibrous mat comprising
(a) passing said non-woven fibrous mat over a rotating first roll and subsequently over a rotating second roll,
wherein each of said first and second rolls rotate in opposite directions and have extending radially outward therefrom at least one rib formed in a chevron pattern, wherein the portions of the rib extending away from the point of the chevron are curved continuously over substantially the entire width of the mat;
(b) subsequently passing said mat between a third roll and a fourth roll which rotate in opposite directions,
wherein each of said third and fourth rolls having extending radially outward therefrom at least one rib formed in a chevron pattern, wherein the portions of the rib extending away from the point of the chevron are curved continuously over substantially the entire width of the mat, and which chevron patterns of the third and fourth rolls are of opposite contour and intermesh with each other,
each of said first, second, third and fourth rolls being of an elongated cylindrical shape, parallel and disposed transversely to said mat, and disposed with the portion of the chevron pattern defining an angle less than 180° toward the mat portion coming into contact with the roll.

8. The method of claim 7, wherein said third or fourth roll is rotationally driven by a driving means, thereby pulling the mat over the first and second rolls and through the intermeshing third and fourth rolls and rotating the first, second, third and fourth rolls.

9. The method of claim 7, wherein said first and second rolls each have one rib extending radially outward formed in a chevron pattern and said third and fourth rolls each have five ribs extending radially outward formed in a chevron pattern.

10. The method of claim 7, wherein the fibers of said non-woven fibrous mat are selected from the group consisting of fiber glass, cellulose or an organic polymer.

11. The method of claim 10, wherein said fibers are fiber glass and the initial thickness of the mat before disrupting is about 8 to 70 mils and after disrupting the thickness is about 2 to 60 times the initial thickness.

12. The method of claim 7, wherein each of the third and fourth rolls comprise a plurality of substantially identical integral ribs equally spaced and extending around the periphery of the body portion of the roll, said ribs forming a plurality of grooves of similar contour between each adjacent pair of ribs, the opposite sides of each rib being substantially parallel but inclined at a radially outwardly diverging angle with respect to the nearest side of the adjacent rib.

13. The method of claim 7, wherein the linear speed of said mat and the rate of movement of the surfaces of the first, second, third and fourth rolls are substantially identical.

14. A process for the production of a structural laminate comprising passing a non-woven fibrous mat under tension over a first rotating roll having extending radially outwardly therefrom and helically therearound at least one rib formed in a chevron pattern, wherein the portions of the rib extending away from the point of the chevron are curved continuously over substantially the entire width of the mat passing said mat over a second rotating roll having extending radially outwardly therefrom and helically therearound at least one rib formed in a chevron pattern disposed on said second roll, wherein the portions of the rib extending away from the point of the chevron are curved continuously over substantially the entire width of the mat, and wherein both of said first and second rolls are disposed with the portion of the chevron pattern defining an angle less than 180° toward the mat portion coming into contact with said first or second roll, depositing between two facing sheets a polymeric foam reaction mixture and said non-woven fibrous mat, and allowing the reaction mixture to foam and fill the space within the mat and between said two facing sheets.

15. The process of claim 14, wherein said polymeric foam reaction mixture is a polyisocyanurate foam reaction mixture.

16. The process of claim 15, wherein said polyisocyanurate foam reaction mixture comprises a polyisocyanate, a polyol, a blowing agent and a catalyst.

17. The process of claim 14, wherein said facing sheets are flexible facing sheets.

18. The process of claim 14, wherein said non-woven fibrous mat is a fiber glass mat.

19. The process of claim 14, wherein said process is a continuous process and the mat is deposited between said two facing sheets in a relaxed state.

20. The product produced by the process of claim 14.

* * * * *